March 29, 1932.  P. DE MATTIA  1,851,003

VULCANIZING MOLD

Filed Jan. 10, 1927  5 Sheets-Sheet 2

Fig. 2.

INVENTOR.
Peter De Mattia
BY
Rogers Kennedy Campbell
ATTORNEYS

March 29, 1932.　　P. DE MATTIA　　1,851,003

VULCANIZING MOLD

Filed Jan. 10, 1927　　5 Sheets-Sheet 3

INVENTOR.
Peter De Mattia
BY
Rogers, Kennedy & Campbell
ATTORNEYS

Patented Mar. 29, 1932

1,851,003

UNITED STATES PATENT OFFICE

PETER DE MATTIA, OF PASSAIC, NEW JERSEY, ASSIGNOR, BY MESNE ASSIGNMENTS, TO NATIONAL RUBBER MACHINERY COMPANY, OF AKRON, OHIO, A CORPORATION OF OHIO

VULCANIZING MOLD

Application filed January 10, 1927. Serial No. 160,174.

This invention relates to improvements in vulcanizing molds for use in the production of rubber tires, inner tubes, and the like, and has particular reference to molds of the so-called "book type".

The general object of the invention is to provide a vulcanizing mold which will expedite the vulcanizing process by virtue of the fact that the tires may be applied within and removed from the mold with greater rapidity and ease than in the case of prior devices.

Heretofore it has been customary to mount an unvulcanized tire on a supporting rim with an air bag, and subsequently to position the tire and rim in one section of the vulcanizing mold, after which the mold is closed. The application of the tire to the supporting rim involves considerable labor and machinery, and after their assembly the tire and rim must be accurately positioned with reference to the mold cavities. Considerable force is then necessary to draw the two mold sections together to confine the rubber in the cavities and to resist the high internal pressure employed in the vulcanizing process. After the vulcanization has been completed, it is difficult to open the mold and remove the work, because of the tendency of the rubber to adhere to the mold cavities. The work involved in the above-mentioned operations renders the same tedious, slow and costly. These objectionable features of the prior art are overcome by the present invention, which provides mechanism for automatically stripping the work from the mold as the latter is opened.

A feature of the invention is the provision, in connection with a vulcanizing mold having walls which define mold cavities, and including seats for the reception of the beads of an unmounted tire, of portions of the mold walls and seats in the form of displaceable blocks which are collectively held and moved with reference to both mold sections as the mold is opened, whereby to automatically strip the work from the mold cavities. Another feature of the invention is the provision of novel mechanism for actuating said displaceable blocks by the opening movement of one of the mold sections, and preferably said blocks will have a simultaneous and differential movement with reference to both mold sections. Another feature of the invention is the provision of means for separating the tire holding and stripping blocks whereby to release the vulcanized tire after it has been stripped from the mold cavities. Such means includes a latch member pivoted to one of the blocks and engaging a pin on the other block, and influenced by a spring to normally hold the two blocks together. The latch member is provided with tripping means actuated after the opening movement has continued to a definite point.

Another feature of the invention resides in a novel and simplified mechanism for drawing the mold sections together in their final closing movement and for moving them apart at the beginning of their opening movement.

These and other features and advantages of the invention will be readily apparent from the following description when taken in connection with the accompanying drawings, wherein one embodiment of the invention is shown by way of illustration, and wherein.

The invention has been shown in the drawings as applied to a vulcanizing mold for use in the manufacture of automobile tires, but the various features are not restricted to this specific embodiment. The mold includes a pair of opposed mold sections 10 and 11, which are jacketed in the usual manner to provide steam heating chambers 12 and 13, and said sections being respectively mounted on central supporting members 14 and 15 in the form of circular plates. The member 14 is held in fixed position by a pair of posts 16 which extend upwardly from a base 17, while the member 15 is carried by a pair of swinging arms 18 which are pivoted to the base at 19 below the mold. An angular offset 20 at the lower portion of each arm 18 is so proportioned as to place the center of gravity of the swinging mold section 11 close to the pivotal center 19, rendering said arms 18 and their associated parts capable of easy movement in opening and closing the mold. The mold sections 10 and 11 are preferably detachable from the supporting members 14 and 15, whereby molds of different sizes or different tread designs may be interchanged in a single machine frame, each mold section being provided with an inwardly extending flange 21 of standardized proportions to fit upon annular seats 22 and 23 adjacent the peripheries of the supporting plates 14 and 15, and being fastened thereto by studs or bolts 24. Thus, the mold sections are capable of relative engagement or separation, as desired, and are capable of being locked together by means which will hereinafter be fully described.

The inner faces of the opposed mold sections 10 and 11 are respectively provided with the usual mold cavities 25 and 26 having lateral or cylindrical walls 27 which form seats for the bead portions of an unmounted tire 28 during the vulcanizing operation. In order to facilitate the insertion of the tire within the mold, and its subsequent removal therefrom, novel means are provided for supporting a tire out of the mold cavities when the mold is open, said means functioning to strip the tire from the mold as it is opened.

Figure 1:
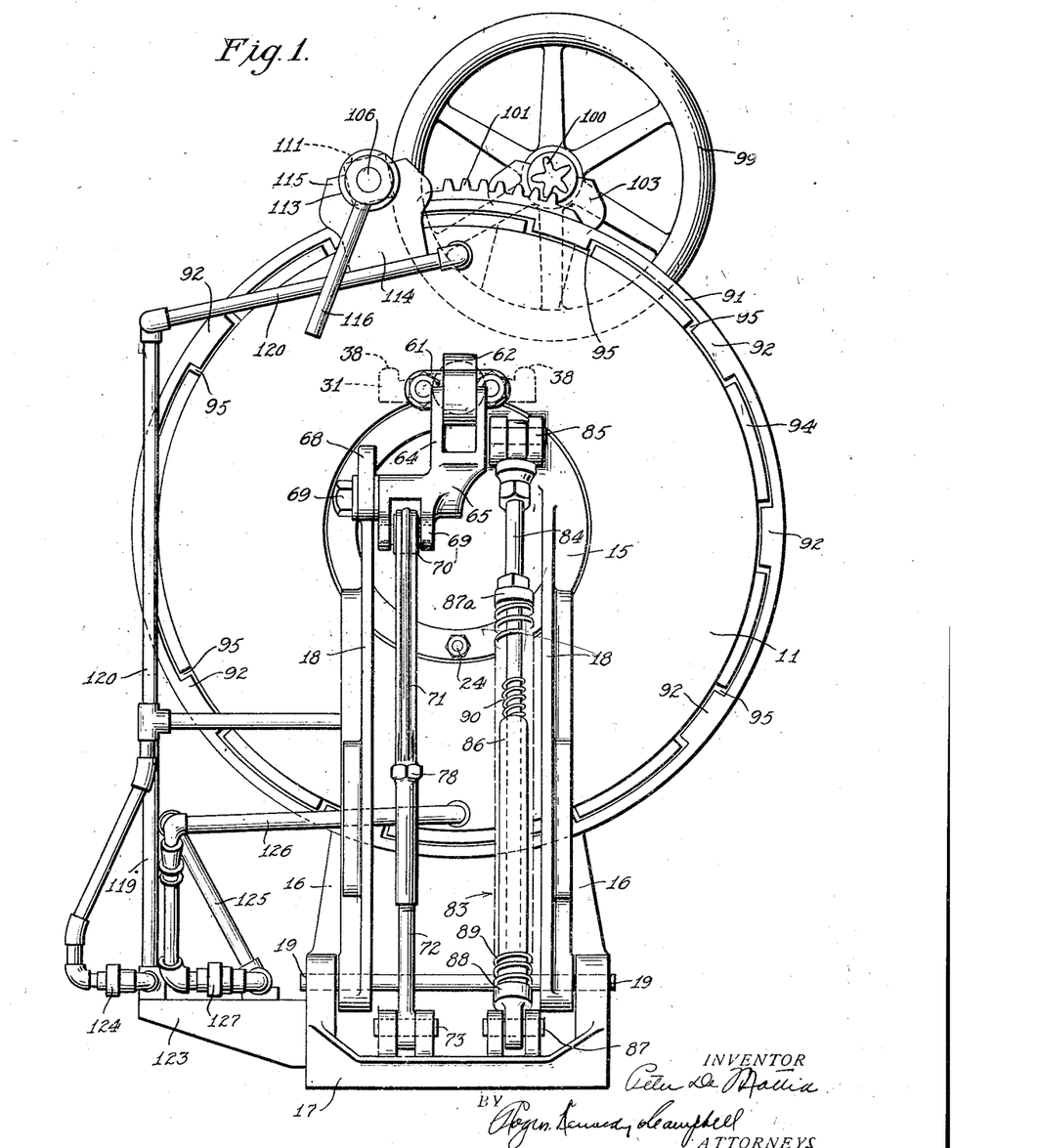
Fig. 1 is a front elevation of an improved tire vulcanizing mold made in accordance with the invention.
Figure 2:
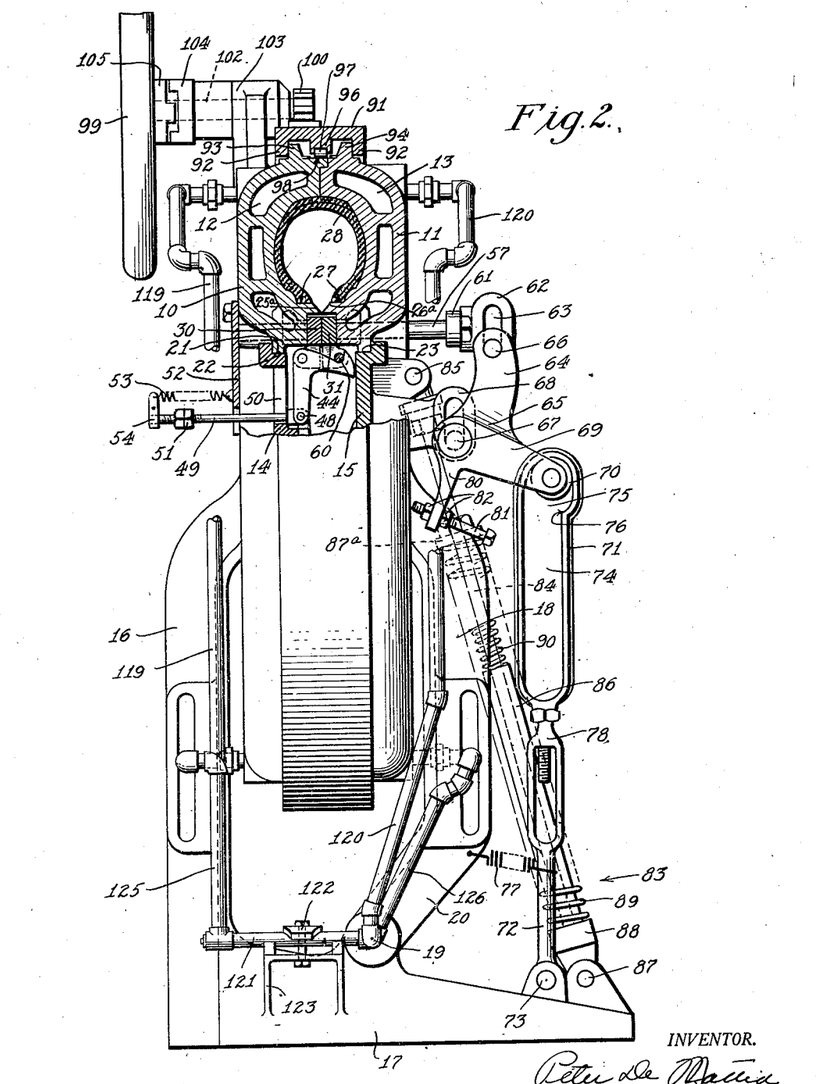
Fig. 2 is a side elevation thereof, with parts broken away and parts in section, showing the mold closed.
Figures 3, 4, 5, 6:
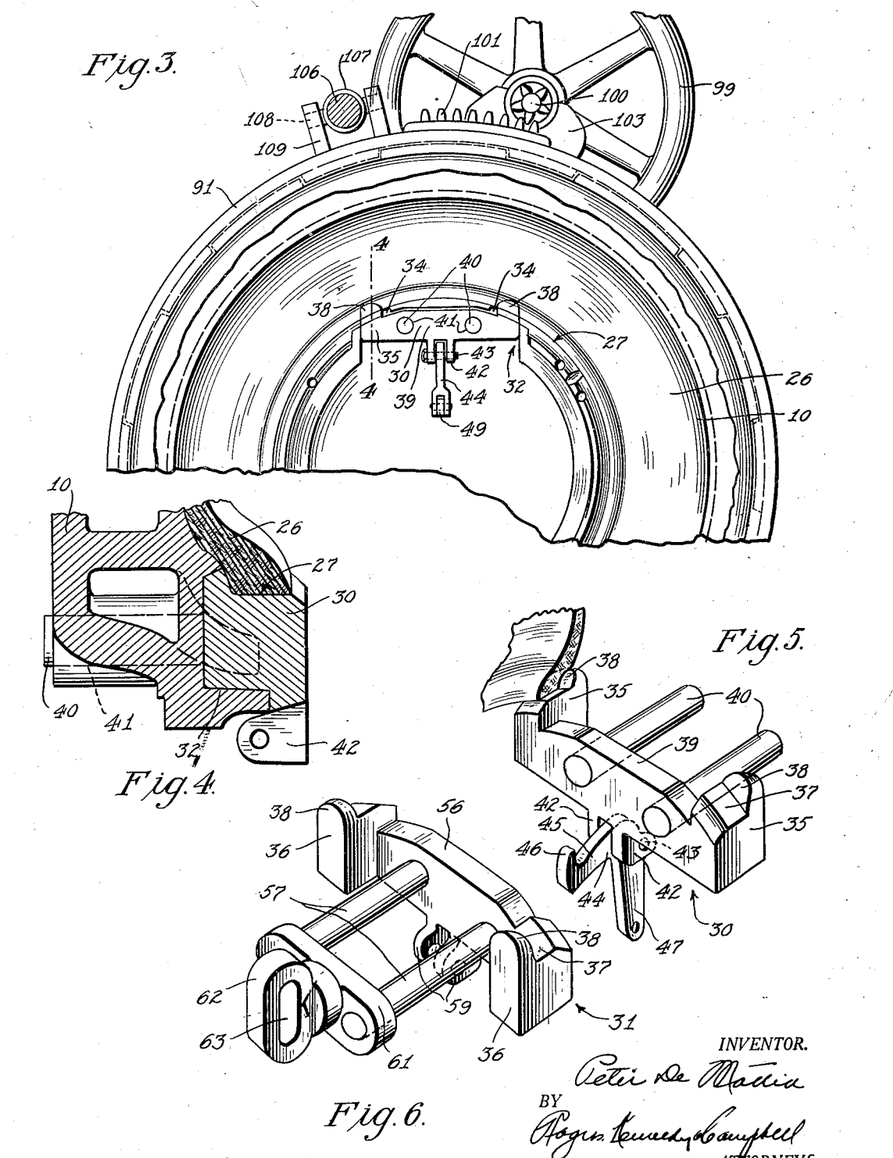
Fig. 3 is a fragmentary interior view of the stationary mold section.
Fig. 4 is a detail sectional view, on a larger scale, taken on line 4—4 of Fig. 3.
Fig. 5 is a detail perspective view of the tire stripping block of the fixed mold section.
Fig. 6 is a similar view of the tire stripping block of the movable mold section.
Figure 7:
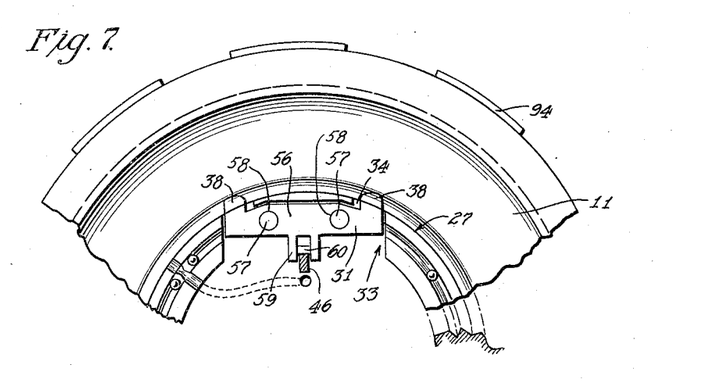
Fig. 7 is a fragmentary interior view of the movable mold section.
Figure 8:
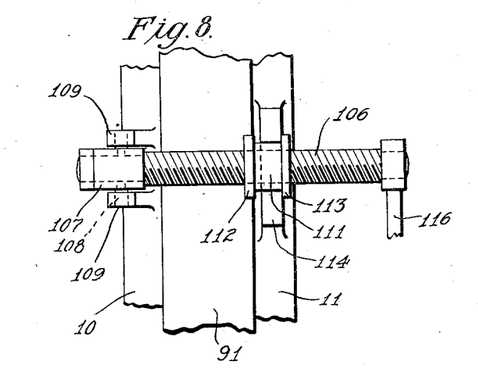
Fig. 8 is a fragmentary top plan view of the mold actuating mechanism with the mold closed.

Referring particularly to Figs. 2, 3, 5 and 6, it will be seen that the tire-supporting and stripping mechanism includes a pair of blocks 30 and 31, the block 30 being adapted to seat within a recess 32 in the mold section 10, while the block 31 is adapted to seat within a similar recess 33 in the mold section 11. The recesses 32 and 33 intersect the mold cavities 25 and 26 by virtue of the fact that the walls 27 are grooved as at 34 (Figs. 3 and 7), and at each of their ends the blocks 30 and 31 are provided with extensions 35 and 36, respectively. The upper surfaces of the extensions 35 and 36 are formed with cylindrical seat portions 37 which, when the mold is closed, constitute extensions of the annular walls 27 at their slotted portions 34, and outwardly of said portions 37 the extensions 35 and 36 are provided with uptensions 35 and 36 are provided with upwardly disposed ears 38, which also merge with the corresponding portions of the mold cavities and which are adapted to engage the outer sides of the beads of the tire (Figs. 4 and 5). The body portion 39 of the block 30 is provided with a pair of spaced parallel supporting rods or dowels 40, said rods being slidably mounted in transverse apertures 41 in the stationary mold section 10. Extending downwardly from the lower edge of the body portion 39 is a pair of spaced ears 42, between which is pivoted, at 43, a latch member 44 having an arm 45, which latter extends toward the block 31 and is provided at its extremity with a hook 46, and with a downwardly extending arm 47 whose lower end is connected at 48 to a sliding link 49. The link 49 extends outwardly through a slot 50 in the supporting member 14 and is provided with an adjustable abutment 51 which, when the mold is closed, is spaced from a striking plate 52 secured to the mold section 10. A retractile spring 53 connects the extremity 54 of the link 49 with the striking plate 52 in such a manner as to exert an inward force on the link 49 for the purpose of maintaining the latch member 44 in its proper position at all times.

The body portion 56 of the block 31 is similar to the portion 39 of the block 30, and is provided with a pair of spaced parallel rods or dowels 57, which extend outwardly through guiding apertures 58 in the mold section 11, said rods 57 being capable of sliding movement in said apertures. Depending from the lower edge of the body portion 56 is a pair of spaced ears 59 giving support to a cross pin 60, which is adapted to cooperate with the hook 46 of the latch member 44 in normally holding the blocks 30 and 31 together. The outer ends of the supporting rods or dowels 57 are connected together by a yoke 61, having an enlarged head 62 disposed in a vertical plane and provided with an elongated slot 63. The length of the rods 57 is such that when the block 31 is seated within its recess 33, the yoke 61 is spaced away from the outer side of the mold section 11, and when the mold is opened and the rods 57 slid so that the yoke 61 engages the outer surface of the mold section 11, the block 31 will be positioned outside of the recess 32.

In order to automatically move the blocks 30 and 31 with reference to their respective mold sections during the opening of the mold, the head 62 of the yoke 61 is connected to an arm 64 of a bell-crank 65, said arm 64 having a pin or bolt 66 extending into the slot 63. The bell-crank 65 is adjustably pivoted at 67 to a slotted bracket 68 which extends outwardly from the supporting member 15 and is secured thereto in any suitable manner. A second arm 69 of the bell-crank 65 is provided at its extremity with a roller 70 which engages within a slotted head 71 of a link 72 which is pivoted at 73 to the base 17. The pivotal center at 73 is disposed outwardly or forwardly with respect to the pivotal center 19 of the swinging mold section 11, and the head 71 of the link is formed with a relatively long slot 74, the upper end of which is widened as at 75 forming a shoulder 76 which, in effect, constitutes a cam for a purpose which will hereinafter be explained. The link 72 is under the influence of a coiled spring 77, which normally tends to draw the link inwardly toward the swinging arms 18, and the length of said link may be adjusted as required by means of a turnbuckle connection 78 with its slotted head 71. Extending substantially perpendicular to the arm 69 and preferably integral therewith is a lug 80 having a threaded aperture for the reception of an adjustable screw 81 which may be locked in its adjusted position by means of lock nuts 82, the arrangement being such that at certain intervals in the operation of the device, the head of the adjustable screw 81 will contact with the inner edge of the head member 71 of the pivoted link 72. In Fig. 2, the mold is shown in closed position and the various parts of the stripping mechanism are shown in the positions which they occupy in this condition. The blocks 30 and 31 are seated within their respective recesses 32 and 33 in abutting relation with respect to each other, the latch 44 engaging the pin 60, and the abutment 51 being spaced beyond the outer side of the striking plate 52. It will also be noted that in this condition the pin 66 is practically at the bottom of the slot 63, and that the roller 70 is at the upper end of the widened portion 75 of the slot 74.

In view of the fact that the mold is upright, and that the movable mold section 11 swings downwardly, it will be an easy matter for the operator to open and close the mold. The ease of operation may be further augmented by the provision of counterbalancing mechanism 83, which includes a telescopic rod section 84 having its upper end pivoted as at 85 to the member 15, and its lower end slidably received within a tubular member 86, which in turn is pivoted at 87 to the base of the machine. The telescopically connected portions 84 and 86 are respectively provided with collars 87ª and 88 between which a compression spring 89 is confined. The pivotal center 87 is disposed forwardly of the pivot 19, whereby in opening the mold, the collar 87ª approaches the collar 88, thus gradually increasing the resistance of the spring 89. Surrounding the rod section 84 and resting on the upper end of the tubular member 86 is a smaller coil spring 90 which acts as a buffer, the arrangement being such that as the mold section 11 reaches a predetermined point in its opening movement, the collar 87ª comes in contact with the upper end of said spring 90 and compresses it until its resistance, coupled with that of the spring 89, is sufficient to overcome the weight of the section 11 and its associated parts.

It is necessary that the mold sections be firmly held together to resist internal pressure during the vulcanizing operation, and to this end a locking ring 91 is rotatably mounted upon the fixed mold section 10, said ring being provided with spaced inwardly extending lugs 92 which are adapted to straddle peripheral flanged portions 93 and 94 on the mold sections 10 and 11 respectively. The flanges 93 and 94 of the movable mold section are provided with a plurality of spaced radial slots 95 corresponding in number with the lugs 92 of the locking ring and of sufficient width to clear said lugs, the slots of the flange 93 being out of alignment with the slots of flange 94, to facilitate assembly of the ring on the fixed mold section. When the ring 91 is rotated, said lugs may be brought into registration with the radial slots 95 of the flange 94 to permit movement of the mold section 11 with reference to the section 10, and in this condition the ring 91 will be maintained on the fixed mold section 10 by virtue of the fact that the slots 95 on the flanges 93 and 94 are respectively out of alignment. The inner surfaces of the lugs 92, or the outer surfaces of the flanges 93 and 94, or both, are slightly beveled or wedge-shaped to render the same easily engageable and to firmly clamp the mold sections in locked relation. On its inner periphery, and between the opposed lugs 92, the ring 91 is provided with a flange 96 which forms a supporting race for a plurality of anti-friction rollers 97, said rollers engaging a cylindrical surface 98 on the fixed mold section 10. The locking ring may be rotated by actuation of a hand wheel 99 which turns a pinion 100 meshing with a gear segment 101 which is carried by the locking ring. The pinion 100 is mounted on one end of a shaft 102 which is journaled in a bracket 103 secured to the fixed mold section 10. The other end of the shaft carries a shouldered coupling 104 and the hand wheel 99, said hand wheel having a cooperating shouldered coupling 105, and capable of partial rotation with reference to the shaft and member 104. Thus there is a substantial back-lash or lost motion between the hand wheel and the pinion 100, whereby it is possible to obtain a "hammer blow" effect in rotating the ring 91.

Figure 9:
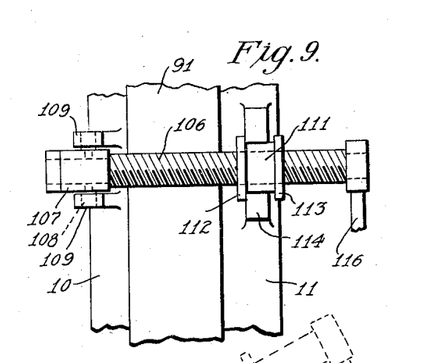
Fig. 9 is a similar view with the mold partly open.
Figure 10:
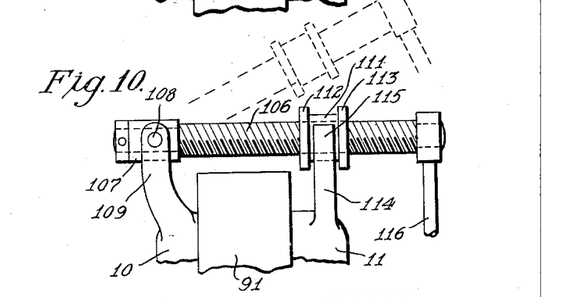
Fig. 10 is a detail side elevation of the mold actuating mechanism.

In Figs. 1, 8, 9 and 10, a simplified form of mold actuating mechanism has been illustrated whereby the mold sections may be forcibly drawn together as a tire is being inserted in the mold prior to vulcanization, and whereby the mold sections may be easily and quickly separated after vulcanization. Such means comprises a quick acting screw 106 which is rotatably secured in a sleeve 107 pivoted at 108 to a pair of spaced ears 109, mounted on the fixed mold section 10. The axis of the pivot 108 is perpendicular to the axis of the screw 106 so that the screw may be swung upwardly to the position shown by dotted lines in Fig. 10. Mounted upon the screw 106 is a nut 111 which is internally threaded to cooperate with the threads upon the screw 106, said nut being provided at its opposite ends with annular flanges 112 and 113. Rising from the movable mold section and preferably integral therewith, is a plate 114 having a recessed or bifurcated upper extremity 115, with which the nut 111 is adapted to cooperate as clearly shown in the drawings. The body portion of the nut 111 between the flanges 112 and 113 may be square, and adapted to be received with a reasonably snug fit in the bifurcated end 115 of said plate, and in this manner, the nut 111 is prevented from rotating as the screw 106 is turned. Any desired type of handle 116 may be provided for operating the screw, and it will be evident that as the screw is turned in one direction or the other, the nut 111 will be moved longitudinally with reference to the sleeve 107, and the movable mold section 11 will be correspondingly moved by virtue of the engagement of either of the flanges 112 or 113 with the plate 114. In opening the mold, it may be initially "broken" by the actuation of the screw 106, as shown in Fig. 9, and after the mold section 11 has been moved away from the mold section 10, the free end of the screw 106 may be swung upwardly to the dotted-line position shown in Fig. 10, after which said swinging mold section will easily open and actuate the tire stripping mechanism.

Steam or other heating fluid is supplied to the mold jackets 12 and 13 through suitable piping 119 and 120 respectively, rising from a single supply pipe 121 which is anchored at 122 to a supporting bracket 123 on the base 17. The piping 120 includes a swivel joint 124 which is in axial alignment with the pivotal center 19 of the movable mold section. Condensation from within the mold jacket is drained through piping 125 and 126 connected at substantially the lowest points in the jacket, the piping 126 also including a swivel joint 127 in axial alignment with the joint 124 and pivotal center 19. While the jackets have been shown as supplied with the heating fluid at only one point and from a single source of supply, they can each be so supplied at a plurality of points from either one or more supply pipes, as is well known to those well skilled in the art.

By way of recapitulation, the operation of the machine will now be described. Starting with the parts in position as shown in Fig. 2, and assuming that the tire 28 has been sufficiently vulcanized, the mold may be unlocked by rotating the hand wheel 99 and pinion 100, turning the locking ring 91 to the position shown in Fig. 1, wherein the lugs 92 are in alignment with the slots 95 in flange 94. By then rotating the handle 116 in a clock-wise direction (Fig. 1), the screw 106 and nut 111 will forcibly separate the mold sections swinging the section 11, its arms 20, and associated parts outwardly from the fixed section 10. At this stage in the operation, the two blocks 30 and 31 are being collectively held together by the latch 44 under the free influence of its spring 53. As the mold section 11 is then swung downwardly, the two blocks are moved outwardly with a positive action, being pulled away from the fixed section 10 to strip the tire therefrom and pushed away from the swinging section 11 to strip the tire from it at or about the same time. In the operation of the parts, the blocks are drawn away from the fixed mold section at a faster speed than that at which they are operated away from the swinging mold section, due to the action of the link 72 which tends to turn the bell-crank lever 65 counter-clockwise at the same time that the lever is being carried bodily in a clockwise direction by the movement of the swinging mold section.

Figures 11, 12, 13, 14:
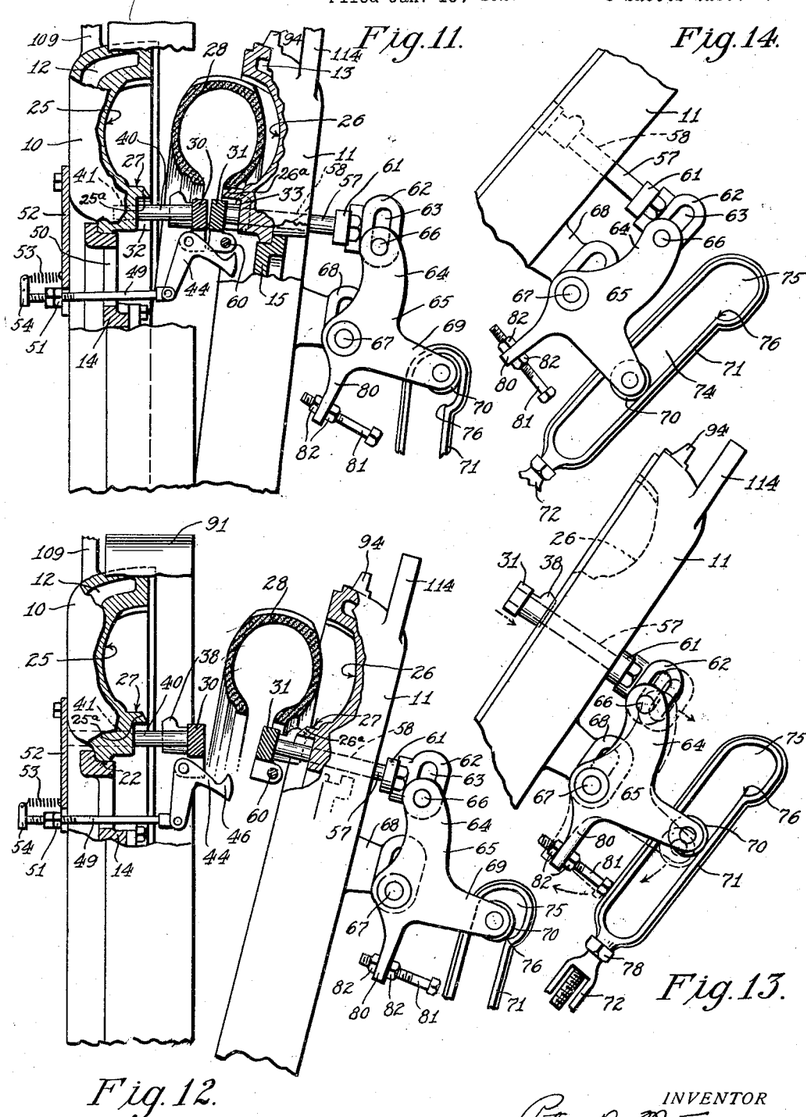
Figs. 11 to 14, inclusive, are detail views of the tire-supporting and stripping mechanism in four different positions during the opening movement of the mold.

As the opening movement of the mold section 11 continues, the abutment 51 comes in contact with the striking plate 52, which arrests movement of the link 49 and thereby trips the latch 44, disconnecting the block 31 from the block 30, as shown in Fig. 11. Further movement of the mold section 11, after the latch 44 has been tripped, results in further displacement of the block 31 from its recess 33, and finally in a downward movement of the roller 70 in the slotted head 71. When the roller 70 reaches the shoulder 76 as shown in Fig. 12, the bell-crank 65 is given a quick movement in a counter-clockwise direction to complete the stripping of the tire from the movable mold section 11 and in view of the face that the blocks 30 and 31 have become separated, the tire may now be easily lifted out of the mold by the operator.

Continuing the opening movement, the roller 70 moves downwardly in the slot 74 and soon the head of the screw 81 abuts the inner edge of the slotted head 71 of link 72 (Fig. 13), producing a tripping action by which the bell-crank 65 is moved in a clockwise direction, reseating the block 31 in recess 33, as shown in Fig. 14. During the opening movement of the mold section 11 as just described, the counter-balancing mechanism 83 has been operating, the rod 84 having moved into the tubular member 86 compressing the spring 89, and the movement being finally arrested by the buffer spring 90.

When the mold stands open, it will be an easy matter for the operator to insert an unvulcanized tire preparatory to vulcanization, it being only necessary to place the tire in the mold cavity 26 with the corresponding bead properly seated on the wall 27. After inserting the unvulcanized tire, the mold section 11 can easily be swung upwardly and inwardly against the fixed mold section 10, the final closing movement being effected by means of screw 106, nut 111, and handle 116. When the mold sections have thus been brought into engagement to properly confine the tire, they may be locked in such relationship by rotation of the locking ring 91 to a position in which its opposed lugs 92 straddle the solid portions of the flanges 93 and 94.

As shown in several of the figures (see particularly Figs. 2, 11 and 12) the two mold sections 10 and 11 are provided at the inner peripheries of the tire cavities 25 and 26, immediately adjacent the bead seats 27, with oppositely disposed beveled or cone-shaped surfaces 25ª and 26ª, respectively, which are adapted to engage the inner or bead edges of the tire and center and guide the same to its seat in the two cavities as the mold is closed in the event that the tire is improperly placed in the mold section 26 or becomes displaced therefrom prior to the closing of the mold. The angle or extent of the beveled surfaces may be greater or less than that illustrated, so long as the surfaces are capable of performing their required function.

From the foregoing, it will be evident that an improved vulcanizing mold of extreme simplicity has been produced, with which tires may be expeditiously vulcanized with a minimum amount of labor, and that the mold may be easily opened and closed, quickly locked in closed position, and the work will be automatically stripped from the mold cavities as the mold is opened. Obviously, changes may be resorted to in the details of construction and arrangement of parts, and the right is herein reserved to make such changes as fall within the scope of the appended claims, without departing from the spirit of the invention.

Having thus described my invention, what I claim is:

1. A tire vulcanizing mold including, in combination, a relatively fixed mold section, a movable mold section, a tire supporting member mounted with each mold section, said tire supporting members being movable with reference to their respective mold sections, means for holding the supporting members collectively with the tire as the mold is opened, and means actuated by the opening movement to shift the tire supporting members from both the mold sections, whereby to automatically strip the tire.

2. A tire vulcanizing mold including, in combination, a relatively fixed mold section, a movable mold section, a pair of tire supporting members each mounted with one of the mold sections and adapted to engage one bead of the tire, said tire supporting members being axially movable with reference to their respective mold sections, means for holding the supporting members collectively during the initial opening movement of the movable mold section, means for automatically shifting the supporting members relative to both mold sections whereby to strip the tire therefrom, and means for separating the supporting members to release the vulcanized tire.

3. In a tire vulcanizing mold, a fixed mold section, a movable mold section hinged with reference thereto, the opposed faces of said mold sections being provided with recesses, and tire stripping means associated with the mold and automatically actuated by the movement of the movable mold section, said stripping means including a pair of opposed blocks adapted to be seated in said recesses when the mold is closed and to engage the beads of the tire, means for collectively holding the opposed blocks and the tire as the mold is opened, and means for separating the blocks to release the tire as the opening movement continues.

4. In a tire vulcanizing mold, a pair of opposed mold sections hinged with reference to each other, the opposed faces of said sections being provided with mold cavities and recesses intersecting the cavities, a pair of blocks adapted to support a tire when the mold is open and to be seated in said recesses when the mold is closed, portions of said blocks forming continuations of the mold cavities to engage the opposite sides of the tire, and means for collectively moving the pair of blocks and the tire with reference to both of the mold sections as the mold is opened.

5. In a tire vulcanizing mold, a pair of opposed mold sections hinged with reference to each other, the opposed faces of said sections being provided with mold cavities and recesses intersecting the cavities, a pair of blocks adapted to support a tire when the mold is open and to be seated in said recesses when the mold is closed, portions of said blocks forming continuations of the mold cavities to engage the opposite sides of the tire, means for collectively moving the pair of blocks and the tire with reference to both of the mold sections as the mold is opened, and means for separating the blocks from each other to release the vulcanized tire, said separating means being automatically actuated by the continued opening movement of the mold.

6. In a tire vulcanizing mold, a relatively fixed mold section, a movable mold section hinged with reference thereto, the opposed faces of said sections being provided with mold cavities and recesses intersecting the cavities, a pair of blocks adapted to support a tire when the mold is open and to be seated in said recesses when the mold is closed, portions of said blocks forming continuations of the mold cavities to engage the opposite sides of the tire, a latch for normally securing the pair of blocks together, means for collectively moving the blocks and the vulcanized tire away from their seats in both mold sections as the mold is opened, and means for automatically separating the blocks from each other to release the tire as the opening movement progresses.

7. In a vulcanizing mold, a pair of mold sections capable of relative separation or engagement, spaced peripheral locking members on one of the mold sections, a cooperating locking ring rotatably mounted on the other mold section, means for actuating said locking rings, and independently operable means including a screw-threaded element for drawing the two mold sections together and forcing them apart when the ring is in unlocked position.

8. In a vulcanizing mold, a pair of mold sections capable of relative separation or engagement, spaced peripheral locking members on one of the mold sections, a cooperating locking ring rotatably mounted on the other mold section, means for actuating said locking ring, and independently operable means for drawing the mold sections together and forcing them apart when the ring is in unlocked position, said means including a screw pivoted at one of its ends to one of the mold sections, a threaded nut mounted on the screw, and means on the other mold section for engaging the nut to prevent its rotation when the screw is turned.

9. In combination with a pair of vulcanizing mold sections having opposed mold cavities, each provided with a work stripping member in the form of a displaceable wall portion of the corresponding cavity, and means operated by the opening of the mold for automatically actuating both said displaceable portions to strip the work from the opposed cavities.

10. In combination with a pair of vulcanizing mold sections having opposed mold cavities each provided with a displaceable wall portion, means operated by the opening of the mold for automatically actuating said displaceable wall portions to strip the work with a differential movement from both the mold sections.

11. In combination with a pair of vulcanizing mold sections having opposed mold cavities, work stripping means including displaceable portions of the cavity walls, and means for conjointly displacing said portions of the cavity walls to strip the work therefrom with a differential movement as the mold is opened.

12. In a tire vulcanizer, the combination of a pair of separable mold sections having opposed annular tire cavities with seats for the tire beads, a pair of tire stripping members forming displaceable portions of the bead seats of the respective mold sections, and means for automatically actuating the stripping members as the mold is opened to dislodge the tire from the opposed cavities of the mold sections.

13. In a tire vulcanizer, the combination of a pair of mold sections having opposed annular tire cavities with seats for the tire beads, one of said sections being hinged with reference to the other, a pair of tire stripping members carried by the respective mold sections and forming displaceable portions of the bead seats therein, and means actuated by the opening movement of the hinged mold section for actuating the stripping members to dislodge the tire from the opposed cavities.

In testimony whereof, I have affixed my signature hereto.

PETER DE MATTIA.